(12) United States Patent
Neudorf et al.

(10) Patent No.: US 12,346,271 B2
(45) Date of Patent: Jul. 1, 2025

(54) POINTER SHARING IN QDMA TRANSACTIONS

(71) Applicant: Ciena Corporation, Hanover, MD (US)

(72) Inventors: Kenneth Edward Neudorf, Ottawa (CA); Alain Robert Trottier, St. Albert (CA)

(73) Assignee: Ciena Corporation, Hanover, MD (US)

(*) Notice: Subject to any disclaimer, the term of this patent is extended or adjusted under 35 U.S.C. 154(b) by 200 days.

(21) Appl. No.: 18/336,213

(22) Filed: Jun. 16, 2023

(65) Prior Publication Data

US 2024/0419611 A1 Dec. 19, 2024

(51) Int. Cl.
*G06F 13/16* (2006.01)
*G06F 13/28* (2006.01)
*G06F 13/42* (2006.01)

(52) U.S. Cl.
CPC .......... *G06F 13/1642* (2013.01); *G06F 13/28* (2013.01); *G06F 13/4221* (2013.01)

(58) Field of Classification Search
CPC ... G06F 13/28; G06F 13/4221; G06F 13/1642
USPC ........................................................ 710/305
See application file for complete search history.

(56) References Cited

U.S. PATENT DOCUMENTS

| | | | |
|---|---|---|---|
| 7,133,943 B2* | 11/2006 | Carnevale | H04L 49/901 710/52 |
| 7,317,725 B2 | 1/2008 | Etemadi et al. | |
| 7,769,015 B2 | 8/2010 | Huang | |
| 8,886,878 B1 | 11/2014 | Neudorf et al. | |
| 9,444,566 B1 | 9/2016 | Mustiere et al. | |
| 9,497,522 B2 | 11/2016 | Neudorf | |
| 10,374,786 B1 | 8/2019 | Mustiere et al. | |
| 11,018,674 B1 | 5/2021 | Neudorf et al. | |
| 2006/0288129 A1* | 12/2006 | Pope | G06F 13/385 710/22 |
| 2019/0190853 A1* | 6/2019 | Pope | H04L 49/506 |
| 2022/0155991 A1 | 5/2022 | Neudorf | |
| 2022/0321368 A1* | 10/2022 | Lee | H04L 12/189 |

* cited by examiner

*Primary Examiner* — Brian T Misiura
(74) *Attorney, Agent, or Firm* — Baratta Law PLLC; Lawrence A. Baratta, Jr.

(57) ABSTRACT

A Queue Direct Memory Access (QDMA) system includes circuitry configured to store N pointers in a contiguous block of memory in the QDMA system, wherein N is an integer greater than 1 and there are N queues in the QDMA system with each pointer of the N pointers being associated with a queue of the N queues, receive a pointer packet from a host device connected to a chip device that includes the QDMA system, wherein the pointer packet includes all of the N pointers, and perform a write of contents of the pointer packet over the contiguous block of memory, such that the N pointers are written in one update.

20 Claims, 4 Drawing Sheets

POINTER SHARING IN QDMA TRANSACTIONS

FIELD OF THE DISCLOSURE

The present disclosure relates generally to electrical circuitry, namely memory. More particularly, the present disclosure relates to systems and methods for pointer sharing in Queue Direct Memory Access (QDMA) transactions.

BACKGROUND OF THE DISCLOSURE

QDMA is a type of memory utilized to transmit blocks of memory between two circuits, e.g., a Field Programmable Gate Array (FPGA), Application Specific Integrated Circuit (ASIC), processor, or the like. QDMA utilizes Peripheral Component Interconnect Express (PCIe) for both high bandwidth and high packet count data transfers. The primary mechanism to transfer data using the QDMA is for the QDMA engine to operate on instructions (descriptors) provided by the host operating system. Using the descriptors, the QDMA can move data in both the Host to Card (H2C) direction, or the Card to Host (C2H) direction. The main difference between QDMA and other DMA offerings is the concept of queues. The idea of queues is derived from the "queue set" concepts of Remote Direct Memory Access (RDMA) from high performance computing (HPC) interconnects. These queues can be individually configured by interface type, and they function in many different modes. Based on how the DMA descriptors are loaded for a single queue, each queue provides a very low overhead option for setup and continuous update functionality. By assigning queues as resources to multiple PCIe Physical Functions (PFs) and Virtual Functions (VFs), a single QDMA core and PCIe interface can be used across a wide variety of multi-function and virtualized application spaces.

BRIEF SUMMARY OF THE DISCLOSURE

The present disclosure relates to systems and methods for pointer sharing in Queue Direct Memory Access (QDMA) transactions. In various embodiments, the present disclosure includes techniques for increasing overall throughput for a multiple QDMA function between two devices (e.g., Host (H) and Card (C)). The performance improvement is achieved by packing queue pointers, of each type, into two contiguous blocks of memory (one for read pointers, one for write pointers). By doing this, a single DMA pointer packet can be sent across the link between devices to update all read or write packet pointers for all queues. This improves overall performance because only one pointer packet is required to update all queue pointers. This reduces the bandwidth requirement for the link, allowing that unused bandwidth to be used for more data packets.

In an embodiment, a Queue Direct Memory Access (QDMA) system includes circuitry configured to store N pointers in a contiguous block of memory in the QDMA system, wherein N is an integer greater than 1 and there are N queues in the QDMA system with each pointer of the N pointers being associated with a queue of the N queues, receive a pointer packet from a host device connected to a chip device that includes the QDMA system, wherein the pointer packet includes all of the N pointers, and perform a write of contents of the pointer packet over the contiguous block of memory, such that the N pointers are written in one update. The N pointers can be write pointers from the host, and wherein the circuitry can be further configured to store N read pointers in a second contiguous block of memory in the QDMA system. The pointer packet can be a Transaction Layer Packet (TLP) from Peripheral Component Interconnect Express (PCIe). The pointer packet can be received via a Peripheral Component Interconnect Express (PCIe) link.

The pointer packet can be received via a Peripheral Component Interconnect Express (PCIe) link and is after one or more of (1) the PCIe link being idle and (2) a predetermined update period of time. The chip device can be a Field Programmable Gate Array (FPGA) and the host device is a processor, and wherein the QDMA system can be disposed in the FPGA. The QDMA system can be utilized to queue memory transfers from the chip device to the host device, and wherein memory transfers from the host device to the chip device can be performed without queuing. The chip device can be a first Field Programmable Gate Array (FPGA) and the host device can be a second FPGA. The second FPGA can include a second QDMA system. The circuitry can be further configured to access the N pointers in the contiguous block of memory and perform memory transfer from a memory associated with the chip in the N queues to addresses in memory associated with the host, where the addresses are in the N pointers.

In another embodiment, a method implemented in a Queue Direct Memory Access (QDMA) system includes steps of storing N pointers in a contiguous block of memory in the QDMA system, wherein N is an integer greater than 1 and there are N queues in the QDMA system with each pointer of the N pointers being associated with a queue of the N queues; receiving a pointer packet from a host device connected to a chip device that includes the QDMA system, wherein the pointer packet includes all of the N pointers; and performing a write of contents of the pointer packet over the contiguous block of memory, such that the N pointers are written in one update.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for pointer sharing in Queue Direct Memory Access (QDMA) transactions. The present disclosure reduces the inefficiency of pointer packets by combining multiple pointers into the same packet. For example, for a 64-queue design, only having 16 bytes of overhead for 512 bytes of data increases the packet efficiency to 512/528=97% from 33%. This increased efficiency can then be used to transmit more packets per second over the same link. Advantageously, this approach increases bandwidth without increasing link speed or power consumption. Also, this reduces both power and the logic (e.g., by about 60% less than current designs, allowing the QDMA functions to be implemented in a smaller footprint (e.g., FPGA).

QDMA Overview

As described herein, QDMA is a hardware (HW)-based implementation for memory transfer that allows two devices to transfer memory to one another, without the use of software resources executed on the devices. The Q part of QDMA allows different types of memory transfers so they can be in different locations. This is because the HW-based transfer in QDMA requires notifying the HW in advance where to dump the memory. Normally in DMA, the transfer starts at an address and transfers a set amount, without distinguishing different memory types. In QDMA, this type of data, in queue 0 (Q0), goes in this section of memory, etc. Of note, after DMA does a memory transfer, the remote host has to read the memory and decide where to move it. QDMA removes this step by predetermining based on the queue. For example, in a networking example, one queue may include packets, another queue may include MSIX data, and the like.

In an embodiment, the devices can be an FPGA and a general processor (e.g., Intel-based CPU) or a network processor (NPU). Of course, other devices are contemplated herewith. The foregoing description utilizes the QDMA nomenclature of chip and host and the associated directions of transfers are denoted as C2H (chip to host) and H2C (host to chip). For illustration purposes, the present disclosure assumes the chip is an FPGA and the host is a processor (CPU, NPU, etc.). The QDMA circuitry or engine is located on the FPGA.

Data transfer in QDMA can be via PCIe. The present disclosure contemplates the use of PCIe for transferring along with other protocols. The primary mechanism to transfer data using the QDMA is for the QDMA engine to operate on instructions (descriptors) provided by the host operating system. Using the descriptors, the QDMA can move data in both the Host to Card (H2C) direction, or the Card to Host (C2H) direction. There are two sides in a memory transfer, i.e., a receive side (A) and a transmit side (B). A and B are the two circuits, i.e., FPGA, ASIC, processor, etc. We use A and B instead of C and H because both the C and H can receive as well as transfer.

Of note, the QDMA circuit can be used to just send in one direction, such as from C2H. If the chip is an FPGA and the host is a processor, the FPGA is able to receive data from the processor faster than the processor is able to send, so there is no reason to queue data. Alternatively, the chip can be an FPGA and the host can be another FPGA, and it is possible to use QDMA in both directions, including the improved techniques described herein. Those skilled in the art will appreciate the techniques for QDMA transfer only need to occur in one direction, e.g., C2H.

On a per queue basis, A sends pointers for the empty Random Access Memory (RAM) locations to B. The pointers are sent via Transaction Layer Packets (TLPs). When B has data to send to A, and it has a free pointer from A, data is sent to A. The pointer for the data is then sent back to A indicating that that location in memory has a valid data packet. A then recovers the data packet from memory and sends the pointer back to B. Normally, there is a block of pointers reserved for each queue, so that multiple data packets and pointers can be in transition across the link at any one time.

With respect to terminology, a TLP packet, a pointer packet, a TLP pointer packet are all equivalent and refer to PCIe packets used to send pointer updates between devices. Conversely, the term data packet used herein refers to a packet used to perform memory transfer between the two devices. The present disclosure reduces the number of pointer packets thereby allowing more bandwidth for data packets over the PCIe link.

In the current QDMA design, handshaking (i.e., the process of communicating TLP packets to provide pointer addresses) is done individually for each queue. For each data packet, there is a corresponding TLP pointer packet. The issue with this solution is that there is a large header associated with both the data packet and pointer packet, (16 bytes in the case of PCIe) and the TLP pointer packet only contains 8 bytes of data. This means the pointer packet is only 33% efficient. If there is a high data packet per second transfer rate, there is an equally high pointer packet per second transfer rate. Since 66% of the pointer packet is overhead, the actual net data rate is only 33% of the bandwidth allocated for pointer traffic. Further, we have to send TLP pointer packet individually for each queue.

Accordingly, the present disclosure allows use of a single TLP pointer packet (handshaking) for all queues—removing a significant amount of handshaking. To accomplish this, we store the pointers in contiguous blocks of memory in the QDMA circuitry. We use PCIe to write the contents of the TLP pointer packet in a single write, which works since the pointers are stored in contiguous blocks of memory.

Figure 1:
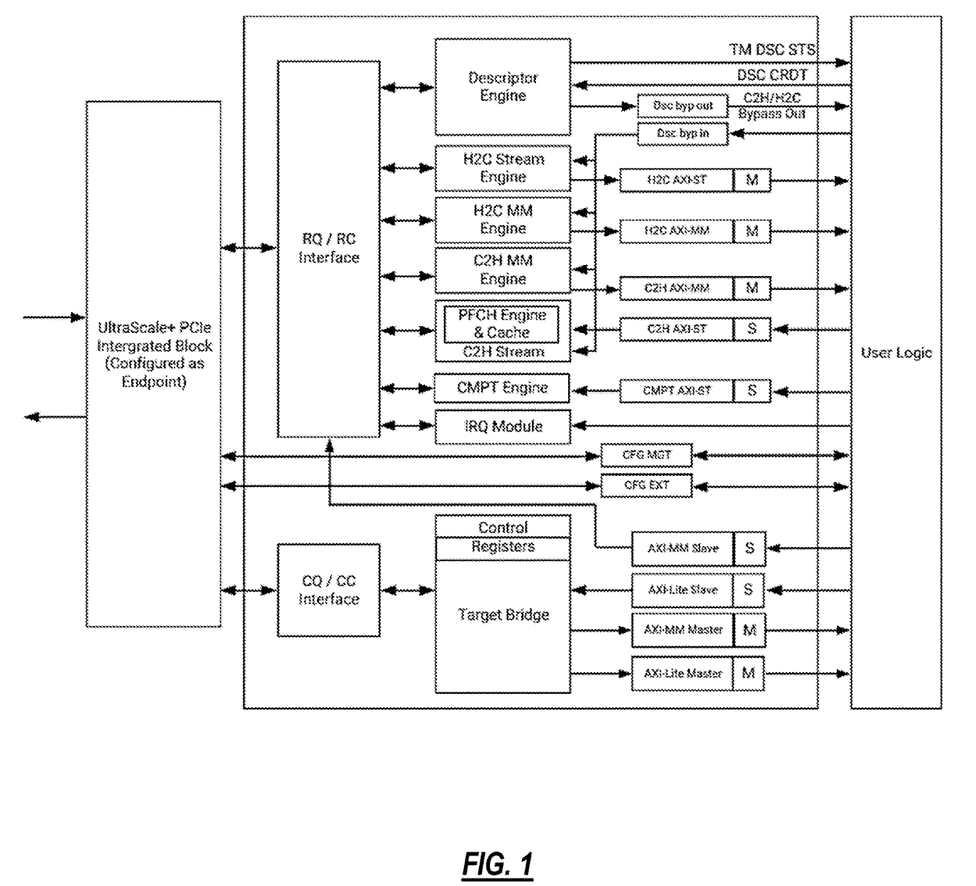
FIG. 1 is a block of a QDMA architecture for PCIe.

FIG. 1 is a block of a QDMA architecture for PCIe. FIG. 1 is from QDMA Subsystem for PCI Express, PG302 (v5.0) May 10, 2023, from AMD (Xilinx), the contents of which are incorporated by reference in their entirety, and the details of the components are included as follows.

Descriptor Engine

The Host to Card (H2C) and Card to Host (C2H) descriptors are fetched by the Descriptor Engine in one of two modes: Internal mode, and Descriptor bypass mode. The descriptor engine maintains per queue contexts where it tracks software (SW) producer index pointer (PIDX), consumer index pointer (CIDX), base address of the queue (BADDR), and queue configurations for each queue. The descriptor engine uses a round robin algorithm for fetching the descriptors. The descriptor engine has separate buffers for H2C and C2H queues, and ensures it never fetches more descriptors than available space. The descriptor engine will have only one DMA read outstanding per queue at a time and can read as many descriptors as can fit in a PCI Max Read Request Size (MRRS). The descriptor engine is responsible for reordering the out of order completions and ensures that descriptors for queues are always in order. The descriptor bypass can be enabled on a per-queue basis and the fetched descriptors, after buffering, are sent to the respective bypass output interface instead of directly to the H2C or C2H engine. In internal mode, based on the context settings the descriptors are sent to delete per H2C memory mapped (MM), C2H MM, H2C Stream, or C2H Stream engines. The descriptor engine is also responsible for generating the status descriptor for the completion of the DMA operations. With the exception of C2H Stream mode, all modes use this mechanism to convey completion of each DMA operation so that software can reclaim descriptors and free up any associated buffers. This is indicated by the CIDX field of the status descriptor.

H2C MM Engine

The H2C MM Engine moves data from the host memory to card memory through the H2C AXI-MM interface. The engine generates reads on PCIe, splitting descriptors into multiple read requests based on the MRRS and the requirement that PCIe reads do not cross 4 KB boundaries. Once completion data for a read request is received, an AXI write is generated on the H2C AXI-MM interface. For source and destination addresses that are not aligned, the hardware will shift the data and split writes on AXI-MM to prevent 4 KB boundary crossing. Each completed descriptor is checked to determine whether a writeback and/or interrupt is required.

C2H MM Engine

The C2H MM Engine moves data from card memory to host memory through the C2H AXI-MM interface. The engine generates AXI reads on the C2H AXI-MM bus, splitting descriptors into multiple requests based on 4 KB boundaries. Once completion data for the read request is received on the AXI4 interface, a PCIe write is generated using the data from the AXI read as the contents of the write. For source and destination addresses that are not aligned, the hardware will shift the data and split writes on PCIe to obey Maximum Payload Size (MPS) and prevent 4 KB boundary crossings. Each completed descriptor is checked to determine whether a writeback and/or interrupt is required.

H2C Stream Engine

The H2C stream engine moves data from the host to the H2C Stream interface. For internal mode, descriptors are delivered straight to the H2C stream engine; for a queue in bypass mode, the descriptors can be reformatted and fed to the bypass input interface. The engine is responsible for breaking up DMA reads to MRRS size, guaranteeing the space for completions, and also makes sure completions are reordered to ensure H2C stream data is delivered to user logic in-order.

C2H Stream Engine

The C2H streaming engine is responsible for receiving data from the user logic and writing to the Host memory address provided by the C2H descriptor for a given Queue. The C2H engine has two major blocks to accomplish C2H streaming DMA, Descriptor Prefetch Cache (PFCH), and the C2H-ST DMA Write Engine. The PFCH has per queue context to enhance the performance of its function and the software that is expected to program it.

Completion Engine

The Completion (CMPT) Engine is used to write to the completion queues. Although the Completion Engine can be used with an AXI-MM interface and Stream DMA engines, the C2H Stream DMA engine is designed to work closely with the Completion Engine. The Completion Engine can also be used to pass immediate data to the Completion Ring. The Completion Engine can be used to write Completions of up to 64B in the Completion ring. When used with a DMA engine, the completion is used by the driver to determine how many bytes of data were transferred with every packet. This allows the driver to reclaim the descriptors.

The Completion Engine maintains the Completion Context. This context is programmed by the Driver and is maintained on a per-queue basis. The Completion Context stores information like the base address of the Completion Ring, PIDX, CIDX and a number of aspects of the Completion Engine, which can be controlled by setting the fields of the Completion Context.

The engine also can be configured on a per-queue basis to generate an interrupt or a completion status update, or both, based on the needs of the software. If the interrupts for multiple queues are aggregated into the interrupt aggregation ring, the status descriptor information is available in the interrupt aggregation ring as well.

The CMPT Engine has a cache of up to 64 entries to coalesce the multiple smaller CMPT writes into 64B writes to improve the PCIe efficiency. At any time, completions can be simultaneously coalesced for up to 64 queues. Beyond this, any additional queue that needs to write a CMPT entry will cause the eviction of the least recently used queue from the cache. The depth of the cache used for this purpose is configurable with possible values of 8, 16, 32, and 64.

AXI Memory Mapped Bridge Master Interface

The AXI MM Bridge Master interface is used for high bandwidth access to AXI Memory Mapped space from the host. The interface supports up to 32 outstanding AXI reads and writes. One or more PCIe BAR of any physical function (PF) or virtual function (VF) can be mapped to the AXI-MM bridge master interface. This selection must be made prior to design compilation. The function ID, BAR ID, VF group, and VF group offset will be made available as part of aruser and awuser of the AXI-MM interface allowing the user logic to identify the source of each memory access. The m_axib_awuser/m_axib_aruser [54:0] user bits mapping is listed in AXI Bridge Master Ports.

AXI4-Lite Bridge Master Interface

One or more PCIe BAR of any physical function (PF) or virtual function (VF) can be mapped to the AXI4-Lite master interface. This selection must be done at the point of configuring the IP. The function ID, BAR ID (BAR hit), VF group, and VF group offset will be made available as part of aruser and awuser of the AXI4-Lite interface to help the user logic identify the source of memory access.

PCIe to AXI BARs

For each physical function, the PCIe configuration space consists of a set of six 32-bit memory BARs and one 32-bit Expansion ROM BAR. When SR-IOV is enabled, an additional six 32-bit BARs are enabled for each Virtual Function. These BARs provide address translation to the AXI4 memory mapped space capability, interface routing, and AX14 request attribute configuration. Any pair of BARs can be configured as a single 64-bit BAR.

PCIe CQ/CC

The PCIe Completer Request (CQ)/Completer Completion (CC) modules receive and process TLP requests from the remote PCIe agent. This interface to the UltraScale+ AMD Adaptive SoC Integrated Block for PCIe circuit operates in address aligned mode. The module uses the BAR information from the Integrated Block for PCIe circuit to determine where the request should be forwarded.

PCIe RQ/RC

The PCIe Requester Request (RQ)/Requester Completion (RC) interface generates PCIe TLPs on the RQ bus and processes PCIe Completion TLPs from the RC bus. This interface to the UltraScale+ AMD Adaptive SoC Integrated Block for PCIe® core operates in DWord aligned mode. With a 512-bit interface, straddling is enabled. While straddling is supported, all combinations of RQ straddled transactions might not be implemented.

PCIe Configuration

Several factors can throttle outgoing non-posted transactions. Outgoing non-posted transactions are throttled based on flow control information from the PCIe integrated block to prevent head of line blocking of posted requests. The DMA will meter non-posted transactions based on the PCIe Receive FIFO space.

QDMA Pointer Transfer

Again, using an example of a processor and an FPGA, assuming the processor wants memory from the FPGA. Generally, the transfer process works as follows (1) The processor provides TLP pointer packets to the FPGA telling the QDMA circuitry where to put data for each queue.

(2) The QDMA circuitry starts transferring data according, from the given queues to the address locations for each queue from the TLP pointer packets.

(3) As queues fill up on the processor, the processor provides the last written location in the queue to the FPGA, so the FPGA knows where to send the next block of data.

(4) As the processor uses up data at the front of the queue, the pointer is sent back to the FPGA stating this queue is now free.

The present disclosure addresses significant inefficiencies in the TLP pointer packet transfers. That is, we are sending a TLP pointer packet for every single queue. Further, with PCIe, this transfer is wasteful since the overhead is much greater than the payload, e.g., 4 bytes of payload on a 64-byte packet.

The read (R) and write (W) pointers are in the QDMA memory (registers) and conventionally they are not contiguous, but rather interspersed in different locations. For example, the read (R) pointer for Q0 may be at register X, the write pointer for Q0 may be at register X+1, the read pointer for Q1 may be at register X+N, etc. There is no way using PCIe to do a single write to all these pointers. Also, the conventional approach in QDMA is also to send a separate TLP pointer packet for each queue.

The present disclosure provides significant improvements in reducing TLP pointer packet bandwidth by (1) storing all read pointers for all queues together in a contiguous block of memory in the QDMA circuit and all write pointers for all queues together in another contiguous block of memory in the QDMA circuit, (2) sending all read pointers for all queues in one TLP pointer packet and all write pointers for all queues in another TLP pointer packet, and (3) performing a PCIe write of the contents of the one TLP pointer packet over the contiguous block of memory in the QDMA circuit.

Current Process

Figure 2:
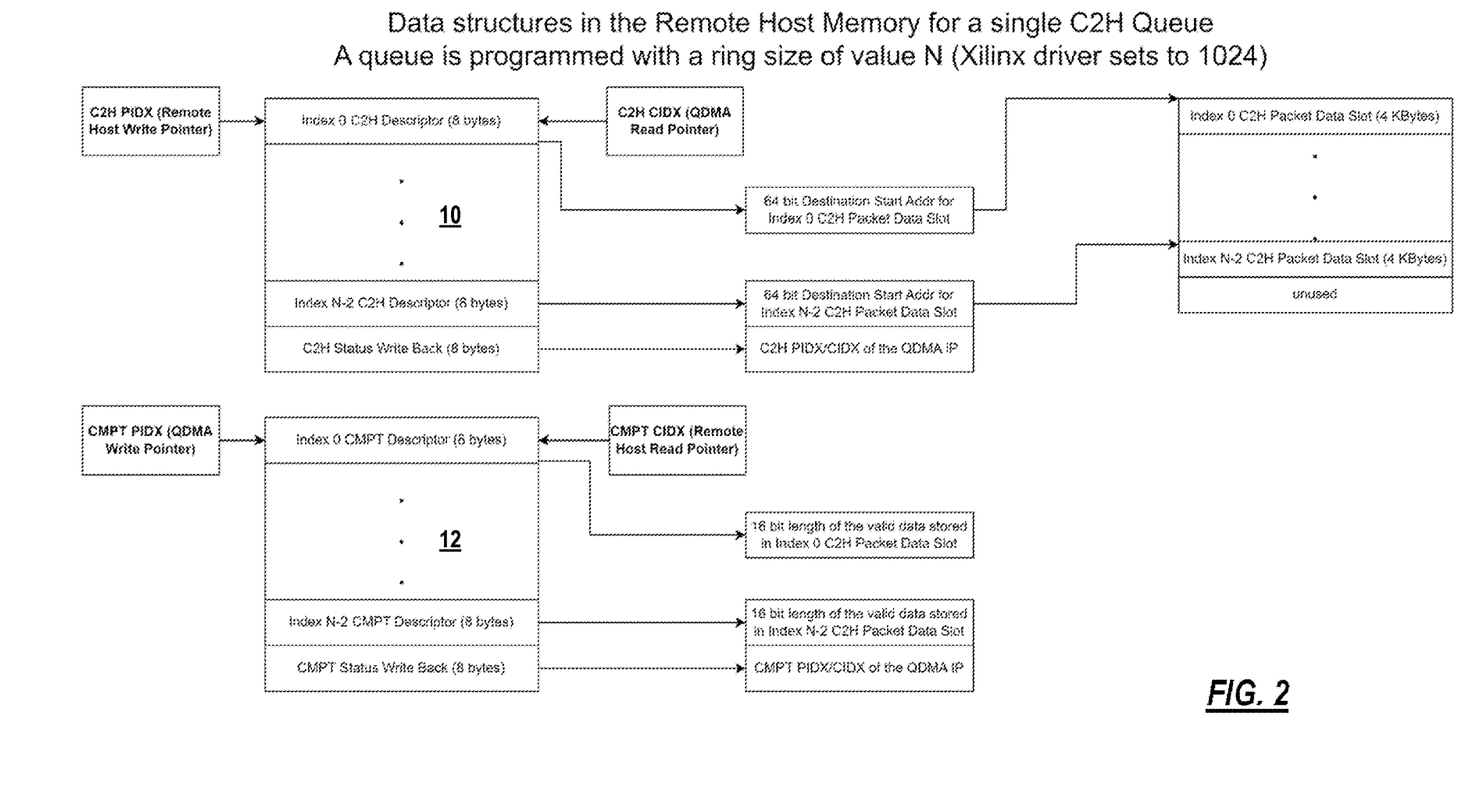
FIG. 2 is a diagram of data structures in the Remote Host Memory for a single C2H Queue.

Details of the current process is as follows, with reference to FIG. 1 and the details of QDMA described herein. FIG. 2 is a diagram of data structures in the Remote Host Memory for a single C2H Queue.

(1) The starting address of this queue's C2H Descriptor/CMPT Descriptor rings in host memory are programmed by the host into the QDMA circuit at startup and cannot be changed while said queue is enabled.

(2) The Remote Host programs the destination start addresses in the C2H Descriptor slots for each C2H packet data slot it wants the QDMA circuit to write the packets to.

(3) The Remote host then sends its C2H PIDX (producer index) to the QDMA IP using one posted write request TLP with a 4-byte payload. This tells the QDMA how many C2H Packet Data slots are free in the host memory to receive packets.

(4) The QDMA circuit sees the Remote host's C2H PIDX for this queue has incremented, indicating there are more free slots.

(5) The QDMA circuit has a data packet to send to this queue. Since there are free slots, it can do so. First it reads the next available slot Index C2H Descriptor using one non-posted read request TLP of length 8-bytes at the address of this C2H descriptor slot.

(6) The remote host sends one completion TLP to this read request with an 8-byte payload with the contents of the addressed slot Index C2H Descriptor to the QDMA circuit. The contents of this payload provide the QDMA with the start address in the host memory where it can write this next packet.

(7) The QDMA circuit now has the start address, so it sends the entire packet using one (or multiple if the total payload exceeds the PCIE's MAX PAYLOAD SIZE setting) posted write TLP(s) to the remote host at the proper destination address (or addresses if multiple TLPs are sent).

(8) The QDMA circuit then updates this Index's CMPT descriptor in the remote host with one posted write TLP with an 8-byte payload which contains the length of the packet it just wrote in that index's C2H packet data slot.

(9) The QDMA circuit then sends its updated CMPT PIDX (producer index) to the remote host by using one posted write TLP with an 8-byte payload to this queue's CMPT Status Write Back slot in the remote host.

(10) Software (SW) running on the remote host polls the C2H queues' CMPT status Write Back slots to detect a change in the QDMA IP's CMPT PIDX for a certain queue which indicates a new packet (or packets) are available to be consumed. The SW already knows the start addresses of each C2H packet data slots since it programmed them initially in step (1). It does not know the length of the packets (how many bytes are valid) in those slots. It gets that information by reading the respective CMPT Descriptors to extract the length of the new packet. It then reads out the data from the respective packet data slot with the proper length. We solve this by adding a preamble to each packet (32 bytes) that includes the frame length along with other data (selectable by SW when they the queues are setup), this way SW knows immediately how long the packet is they are receiving.

(11) After consuming the packet data, the Remote host updates its CMPT CIDX to the QDMA circuit using one posted write request TLP with a 4-byte payload.

(12) The remote host then lets the QDMA circuit know that C2H packet data slot is now free to use again by updating its C2H PIDX to the QDMA circuit like it did in step (3).

Again, there is a block of pointers reserved for each queue, so that multiple data packets and pointers can be in transition across the link at any one time. For each data packet, there is a corresponding pointer packet. The issue with this current process is that there is a large header associated with both the data packet and pointer packet (16 bytes in the case of PCIE), and the pointer packet only contains 8 bytes of data. This means the pointer packet is only 33% efficient, i.e., 8 data bytes divided by 24 total bytes. If there is a high data packet per second transfer rate, there is an equally high pointer packet per second transfer rate. Since 66% of the pointer packet is overhead, the actual net data rate is only 33% of the bandwidth allocated for pointer traffic.

Pointer Sharing in QDMA Transactions.

Again, the present disclosure provides significant performance improvement by packing queue pointers, of each type, into two contiguous blocks of memory (one for read pointers, one for write pointers). By doing this, a single TLP pointer packet can be sent across the link between devices to update all read or write packet pointers for all queues. This improves overall performance because only one pointer packet is required to update all queue pointers. This reduces the bandwidth requirement for the link, allowing that unused bandwidth to be used for more data packets.

For example, assume 64 queues, the present disclosure reduces the inefficiency of the TLP pointer packet by combining multiple pointers into the same packet, thereby only having 16 bytes of overhead for 512 bytes of data (for a 64-queue design, in this example). This increases the packet efficiency to 512/528=97% from 33%. This increased efficiency can then be used to transmit more packets per second over the same link.

Referring back to FIG. 2, this is an example of the data structure in memory for a single C2H queue 10, 12. In this example, the queue 10 is for write pointers and the queue 12 is for read pointers. The memory is in the QDMA circuit, which can be incorporated in an FPGA. The queue 10 is where the host (e.g., processor such as a CPU, NPU, etc.) provides its write pointers in its memory for each queue. The queue 12 is where the host (e.g., processor) provides its read pointer for each queue. In the present disclosure, there will be N of these queues 10, 12, for N queues, and all of these data structures will be located in a contiguous block of memory. Again, all of the queues 10 for all N queues need to be in a first contiguous block of memory and all of the queues 12 for all of the N queues need to be in a second contiguous block of memory.

The memory has to be contiguous for all of the R pointers and the W pointers. It does not necessarily have to be sequential, where register 1 is for Q1, register 2 is for Q2, etc. It obviously is an easier implementation to make them sequential, but they can be in any order known in advance. That is, making them out of order does not affect the implementation as long as HW knows the order.

Figure 3:
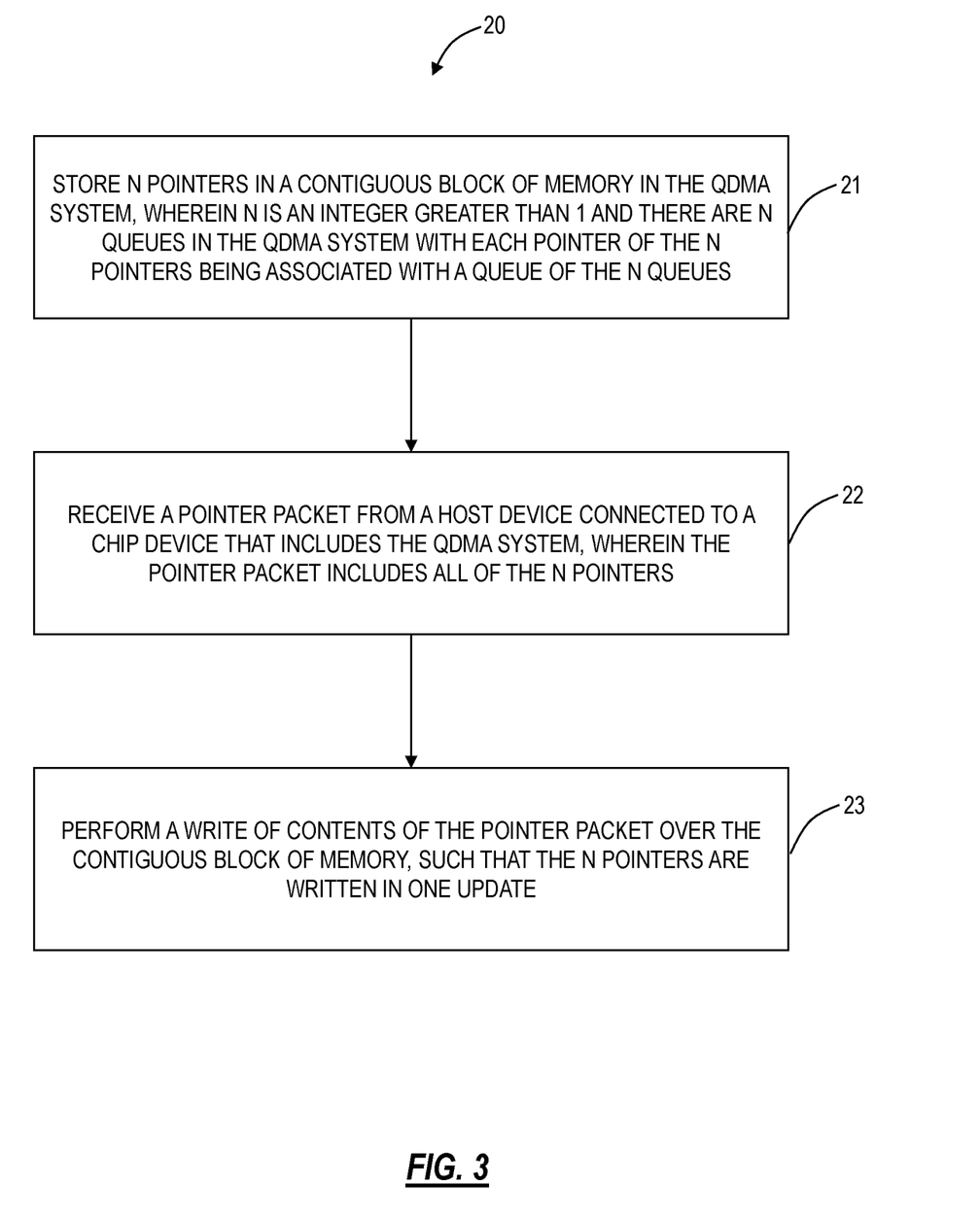
FIG. 3 is a flowchart of a process for QDMA memory transfer using N pointers that are shared in a single pointer packet.

FIG. 3 is a flowchart of a process 20 for QDMA memory transfer using N pointers that are shared in a single pointer packet. The process 20 contemplates implementation in circuitry, namely a QDMA system, which can be integrated in other circuitry, such as a FPGA, ASIC, etc. Also, the process 20 contemplates implementation with a processor and via software instructions, e.g., when the QDMA system is with a general purpose processor. In a further embodiment, the process 20 can be realized as a method having steps, with the method being implemented by some underlying hardware with or without software and/or firmware.

The process 20 includes storing N pointers in a contiguous block of memory in the QDMA system, wherein N is an integer greater than 1 and there are N queues in the QDMA system with each pointer of the N pointers being associated with a queue of the N queues (step 21); receiving a pointer packet from a host device connected to a chip device that includes the QDMA system, wherein the pointer packet includes all of the N pointers (step 22); and performing a write of contents of the pointer packet over the contiguous block of memory, such that the N pointers are written in one update (step 23).

The N pointers can be write pointers from the host, and the process 20 can further include storing N read pointers in a second contiguous block of memory in the QDMA system. For example, we group all write packet pointers into a single contiguous block of memory, and all read packet pointers into a separate contiguous block of memory. The two blocks can be stored in a larger contiguous block of memory or stored at separate locations. As such, it is possible to update all write pointers or all read pointers using a single pointer update packet containing all the new pointer information. SW can send the TLP to HW (FPGA) or the HW can just request the pointer data from the processor side directly over the link.

The pointer packet can be a Transaction Layer Packet (TLP) from Peripheral Component Interconnect Express (PCIe). The pointer packet can be received via the PCIe link and is received after one or more of (1) the PCIe link being idle and (2) a predetermined update period of time. For example, if the link is idle, the pointer update packet can be sent immediately after a data packet has been sent, but if the link is busy, i.e., a lot of traffic pending to be sent, a timer can be used to send the pointer update packet after a predetermined time, which can be programmable.

In an embodiment, the chip device can be a Field Programmable Gate Array (FPGA) and the host device is a processor. The QDMA system can be disposed in the FPGA. In another embodiment, the chip device can be a first Field Programmable Gate Array (FPGA) and the host device can be a second FPGA. The second FPGA can include a second QDMA system, also configured to implement another version of the process 20.

The QDMA system can be utilized to queue memory transfers from the chip device to the host device, and memory transfers from the host device to the chip device can be performed without queuing. The process 20 can further include accessing the N pointers in the contiguous block of memory and performing memory transfer from a memory associated with the chip in the N queues to addresses in memory associated with the host, where the addresses are in the N pointers.

Updated Process

The following provides additional details of the process 20, and is presented to contrast with the process described in section entitled "Current process."

(1) The chip writes the location of the last packet written list for all queues (e.g., contiguous 64 location RAM in host memory).

(2) The host then sends its last packet free pointer for each queue to the QDMA system using one posted write request TLP (e.g., 64 contiguous registers means one entire TLP). This tells the chip how many free packet slots per queue are available in the host memory. The chip will set a full flag based on the host write.

(3) The chip has a data packet to send, and checks the full flag for the associated queue. If not full, send the packet to the next available buffer location. We encode the length of the packet in the preamble.

(4) If bandwidth is available, the chip updates the last packet written for this queue. If no bandwidth is available, the queue last packet written can be updated based on a timer interval. All 64 queues are updated at once with a single TLP.

(5) The software (SW) running on the host monitors that write pointer status. When a new packet has been written for a queue, SW processes the packet and then updates the last packet free pointers into the FPGA (all 64 at the same time with one TLP). Updating the pointers can be done immediately if bandwidth is available or on a timer basis (same as in C2H).

Example System Implementation

Figure 4:
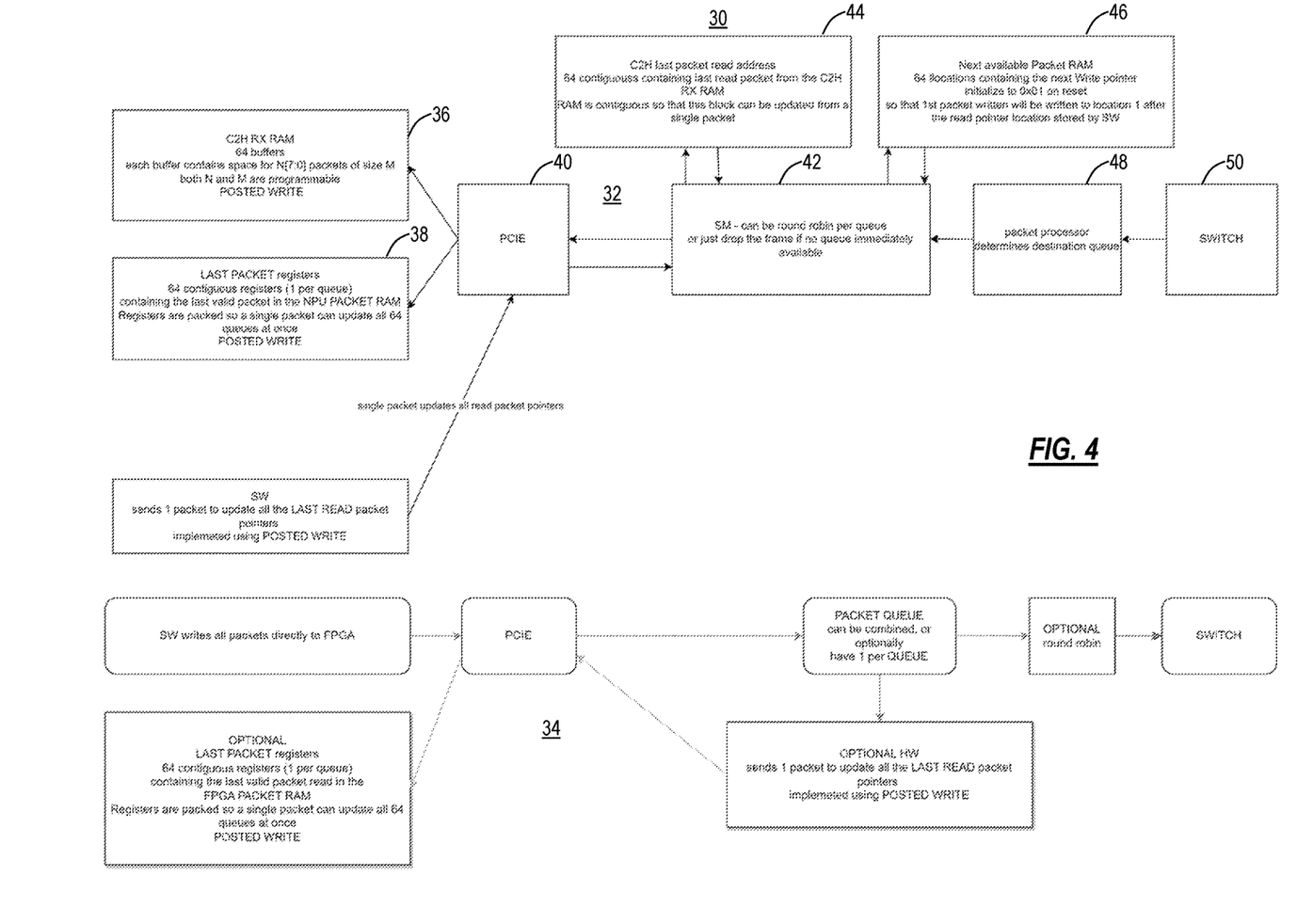
FIG. 4 is a block diagram of an example implementation of a QDMA system.

FIG. 4 is a block diagram of an example implementation of a QDMA system 30. All of the components (boxes) in FIG. 4 are circuitry including memory (registers) as well as logic for performing functions. Connectivity via directed lines in FIG. 4 indicate transfer direction of data.

The QDMA system 30 is shown disposed in an FPGA, namely all of the components (boxes) and directed lines in FIG. 4 are in the FPGA. The FPGA is the chip and the host is a processor, such as a NPU. The QDMA system 30 includes a C2H section 32 (on top) and a H2C section 34 (on bottom). The C2H section 32 includes buffer memory 36 and last packet memory 38, each connected to a PCIe subsystem 40. The PCIe subsystem 40 received data and pointers from components 42-48 which communicate to the host device (NPU) via a switch 50.

With the process 20, the last packet memory 38 is where there is two contiguous blocks of memory, where one pointer packet update is used to update all last read packet pointers using a posted write.

Details of the H2C section 34 are omitted as this direction may not require queuing as when the chip is the FPGA and the host is a processor (NPU, CPU, etc.).

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A Queue Direct Memory Access (QDMA) system comprising circuitry configured to:
   store N pointers in a contiguous block of memory in the QDMA system, wherein N is an integer greater than 1 and there are N queues in the QDMA system with each pointer of the N pointers being associated with a queue of the N queues,
   receive a pointer packet from a host device connected to a chip device that includes the QDMA system, wherein the pointer packet includes all of the N pointers, and
   perform a write of contents of the pointer packet over the contiguous block of memory, such that the N pointers are written in one update,
   wherein the N pointers are write pointers from the host, and wherein the circuitry is further configured to store N read pointers in a second contiguous block of memory in the QDMA system.

2. The QDMA system of claim 1, wherein the pointer packet is a Transaction Layer Packet (TLP) from Peripheral Component Interconnect Express (PCIe).

3. The QDMA system of claim 1, wherein the pointer packet is received via a Peripheral Component Interconnect Express (PCIe) link.

4. The QDMA system of claim 1, wherein the chip device is a Field Programmable Gate Array (FPGA) and the host device is a processor, and wherein the QDMA system is disposed in the FPGA.

5. The QDMA system of claim 1, wherein the chip device is a first Field Programmable Gate Array (FPGA) and the host device is a second FPGA.

6. The QDMA system of claim 5, wherein the second FPGA includes a second QDMA system.

7. The QDMA system of claim 1, wherein the circuitry is further configured to
   access the N pointers in the contiguous block of memory and perform memory transfer from a memory associated with the chip in the N queues to addresses in memory associated with the host, where the addresses are in the N pointers.

8. A Queue Direct Memory Access (QDMA) system comprising circuitry configured to:
   store N pointers in a contiguous block of memory in the QDMA system, wherein N is an integer greater than 1 and there are N queues in the QDMA system with each pointer of the N pointers being associated with a queue of the N queues,
   receive a pointer packet from a host device connected to a chip device that includes the QDMA system, wherein the pointer packet includes all of the N pointers, and
   perform a write of contents of the pointer packet over the contiguous block of memory, such that the N pointers are written in one update,
   wherein the pointer packet is received via a Peripheral Component Interconnect Express (PCIe) link and is after one or more of (1) the PCIe link being idle and (2) a predetermined update period of time.

9. The QDMA system of claim 8, wherein the pointer packet is a Transaction Layer Packet (TLP) from Peripheral Component Interconnect Express (PCIe).

10. The QDMA system of claim 8, wherein the pointer packet is received via a Peripheral Component Interconnect Express (PCIe) link.

11. The QDMA system of claim 8, wherein the chip device is a Field Programmable Gate Array (FPGA) and the host device is a processor, and wherein the QDMA system is disposed in the FPGA.

12. The QDMA system of claim 8, wherein the chip device is a first Field Programmable Gate Array (FPGA) and the host device is a second FPGA.

13. The QDMA system of claim 12, wherein the second FPGA includes a second QDMA system.

14. The QDMA system of claim 8, wherein the circuitry is further configured to
access the N pointers in the contiguous block of memory and perform memory transfer from a memory associated with the chip in the N queues to addresses in memory associated with the host, where the addresses are in the N pointers.

15. A Queue Direct Memory Access (QDMA) system comprising circuitry configured to:
store N pointers in a contiguous block of memory in the QDMA system, wherein N is an integer greater than 1 and there are N queues in the QDMA system with each pointer of the N pointers being associated with a queue of the N queues,
receive a pointer packet from a host device connected to a chip device that includes the QDMA system, wherein the pointer packet includes all of the N pointers, and
perform a write of contents of the pointer packet over the contiguous block of memory, such that the N pointers are written in one update, wherein the QDMA system is utilized to queue memory transfers from the chip device to the host device, and wherein memory transfers from the host device to the chip device are performed without queuing.

16. The QDMA system of claim 15, wherein the pointer packet is a Transaction Layer Packet (TLP) from Peripheral Component Interconnect Express (PCIe).

17. The QDMA system of claim 15, wherein the pointer packet is received via a Peripheral Component Interconnect Express (PCIe) link.

18. The QDMA system of claim 15, wherein the chip device is a Field Programmable Gate Array (FPGA) and the host device is a processor, and wherein the QDMA system is disposed in the FPGA.

19. The QDMA system of claim 15, wherein the chip device is a first Field Programmable Gate Array (FPGA) and the host device is a second FPGA.

20. The QDMA system of claim 15, wherein the circuitry is further configured to
access the N pointers in the contiguous block of memory and perform memory transfer from a memory associated with the chip in the N queues to addresses in memory associated with the host, where the addresses are in the N pointers.

* * * * *